(12) United States Patent
Iwasaki et al.

(10) Patent No.: US 6,507,408 B2
(45) Date of Patent: *Jan. 14, 2003

(54) PRINTER

(75) Inventors: Takeshi Iwasaki, Yokohama (JP); Hiroyuki Inoue, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,731

(22) Filed: Jul. 21, 1998

(65) Prior Publication Data

US 2002/0041382 A1 Apr. 11, 2002

(30) Foreign Application Priority Data

Jul. 31, 1997 (JP) .............................. 9-206551

(51) Int. Cl.⁷ ............................................... H04N 1/00
(52) U.S. Cl. ..................................... 358/1.15; 358/435
(58) Field of Search ................................ 358/407, 428, 358/435, 1.15; 395/114, 500, 116, 152, 163, 172

(56) References Cited

U.S. PATENT DOCUMENTS

| | | | | |
|---|---|---|---|---|
| 4,856,090 A | * | 8/1989 | Kitani et al. ................ | 359/159 |
| 5,717,567 A | * | 2/1998 | Tao ............................. | 361/683 |
| 5,734,891 A | * | 3/1998 | Saigh ......................... | 395/610 |
| 5,757,354 A | * | 5/1998 | Kawamura .................. | 345/126 |
| 5,757,528 A | * | 5/1998 | Brdley et al. ............... | 395/152 |
| 5,857,065 A | * | 1/1999 | Suzuki ........................ | 395/114 |
| 5,861,968 A | * | 1/1999 | Kerklaan et al. ........... | 395/500 |
| 5,880,867 A | * | 3/1999 | Ronald ....................... | 395/152 |

FOREIGN PATENT DOCUMENTS

| | | | | |
|---|---|---|---|---|
| JP | 59-235 | 1/1984 | ............ | H04B/9/00 |
| JP | 1-312621 | 12/1989 | ............ | G06F/3/12 |
| JP | 2-186847 | 7/1990 | ............ | H04B/10/10 |
| JP | 5-167538 | 7/1993 | | |
| JP | 5-290195 | 11/1993 | ............ | G06K/7/10 |
| JP | 8-58107 | 3/1996 | ............ | B41J/2/175 |

* cited by examiner

Primary Examiner—Thomas D. Lee
(74) Attorney, Agent, or Firm—Fitzpatrick, Cella, Harper & Scinto

(57) ABSTRACT

A printer for effecting recording on a recording medium by a recording unit includes a conveying unit for conveying the recording medium, an infrared ray communication unit containing in a case member an infrared ray communication element for effecting data communication with an external data processing apparatus with an infrared ray as a communication medium, and a supporting unit for rotatably supporting the infrared ray communication unit on the printer so as to be protrudable from the surface of the outer case of the printer.

14 Claims, 8 Drawing Sheets

RECORDING MEDIUM EXPELLING DIRECTION

RECORDING MEDIUM EXPELLING DIRECTION

RECORDING MEDIUM EXPELLING DIRECTION

RECORDING MEDIUM EXPELLING DIRECTION

RECORDING MEDIUM EXPELLING DIRECTION

PRINTER

BACKGROUND OF THE INVENTION

1. Field of the Invention

This invention relates to a printer using infrared rays for a data communication medium to effect data communication with an external data processing apparatus such as a computer.

2. Related Background Art

Apparatuses which effect data communication between data processing apparatuses such as computers in a near distance space such as the interior of a room with not a cable but infrared rays as a communication medium are disclosed in Japanese Laid-Open Patent Application No. 59-000235, Japanese Laid-Open Patent Application No. 1-312621 and Japanese Laid-Open Patent Application No. 2-186847. If such optical communication is utilized, the bus lines between the data processing apparatuses can be curtailed or omitted and the degree of freedom of the spatial disposition of the data processing apparatuses will be improved and a reduction in the cost of facilities will be achieved.

However, in the data communication utilizing infrared rays as described above (hereinafter referred to as the "infrared ray communication"), the light emission and light reception of infrared rays have directionality and therefore, unless the angles of disposition of the transmission side data processing apparatus and the reception side data processing apparatus are within an appropriate range, there has been the problem that reliability of data exchange cannot be secured.

So, an apparatus wherein the light receiving portion or the light emitting portion of the infrared ray communication apparatus is contained in a rotatable head portion to effect data exchange more reliably is disclosed in Japanese Laid-Open Patent Application No. 5-167538.

However, when the above-described infrared ray communication apparatus is to be utilized in a printer, if the infrared ray communication apparatus is used independently of the printer body, it is necessary to connect these by a cable, and this has led to problems such as the cumbersomeness of connection and an increase in the area for installation.

Also, an example in which a printer body contains an infrared ray communication apparatus therein is disclosed in Japanese Laid-Open Patent Application No. 5-290195, etc. but generally, the sizes of a computer, an information apparatus, etc. which provide the data transmission side and the position of an infrared ray emitting portion are various. Therefore, when infrared ray communication is to be effected with these apparatuses, it is necessary to appropriately adjust the angles of disposition of the both apparatuses, and this has led to the problem that the installation and operation of the apparatuses become cumbersome.

SUMMARY OF THE INVENTION

It is an object of the present invention to provide a printer in which an area capable of effecting infrared ray communication is secured widely by a simple construction and which saves in space and is provided with an infrared ray communicating function of high reliability.

It is another object of the present invention to provide a printer in which it is made possible to protrude an infrared ray communication unit portion at any angle from the surface of the printer in conformity with the disposition of a data processing apparatus which is the object of data communication and the area of the printer which is capable of effecting infrared ray communication is secured widely and the degree of freedom of the disposition relation between the printer and the data processing apparatus is improved.

It is still another object of the present invention to provide a printer in which an infrared ray communication unit portion is made protrudable from that side of the outer surface of the printer which is along the direction of conveyance of a recording medium and data communication is not hampered by a recording medium set in the printer or a recording medium discharged and the infrared ray communication unit portion does not hamper the recording medium set in the printer or the recording medium discharged.

It is yet still another object of the present invention to provide a printer for effecting recording on a recording medium by recording means, including conveying means for conveying said recording medium, an infrared ray communication unit containing in a case member an infrared ray communication element for effecting data communication with an external data processing apparatus with an infrared ray as a communication medium, and supporting means for rotatably supporting said infrared ray communication unit on said printer so as to be protrudable from the surface of the outer case of said printer.

It is a further object of the present invention to provide a printer for effecting recording on a recording medium by recording means, including conveying means for conveying said recording medium, an infrared ray communication unit having an infrared ray communication element portion for effecting data communication with an external data processing apparatus with an infrared ray as a communication medium, and an infrared ray transmitting window portion for transmitting therethrough an infrared ray emitted or received by said infrared ray communication element portion, and supporting means for making said infrared ray transmitting window portion protrudable from the surface of the outer case of said printer and yet rotatably supporting said infrared ray transmitting window portion and said infrared ray communication element portion on said printer.

DESCRIPTION OF THE PREFERRED EMBODIMENTS

A printer according to an embodiment of the present invention, particularly an embodiment of an ink jet printer (to which the present invention is not restricted) will hereinafter be described with reference to the drawings.

Figure 1:
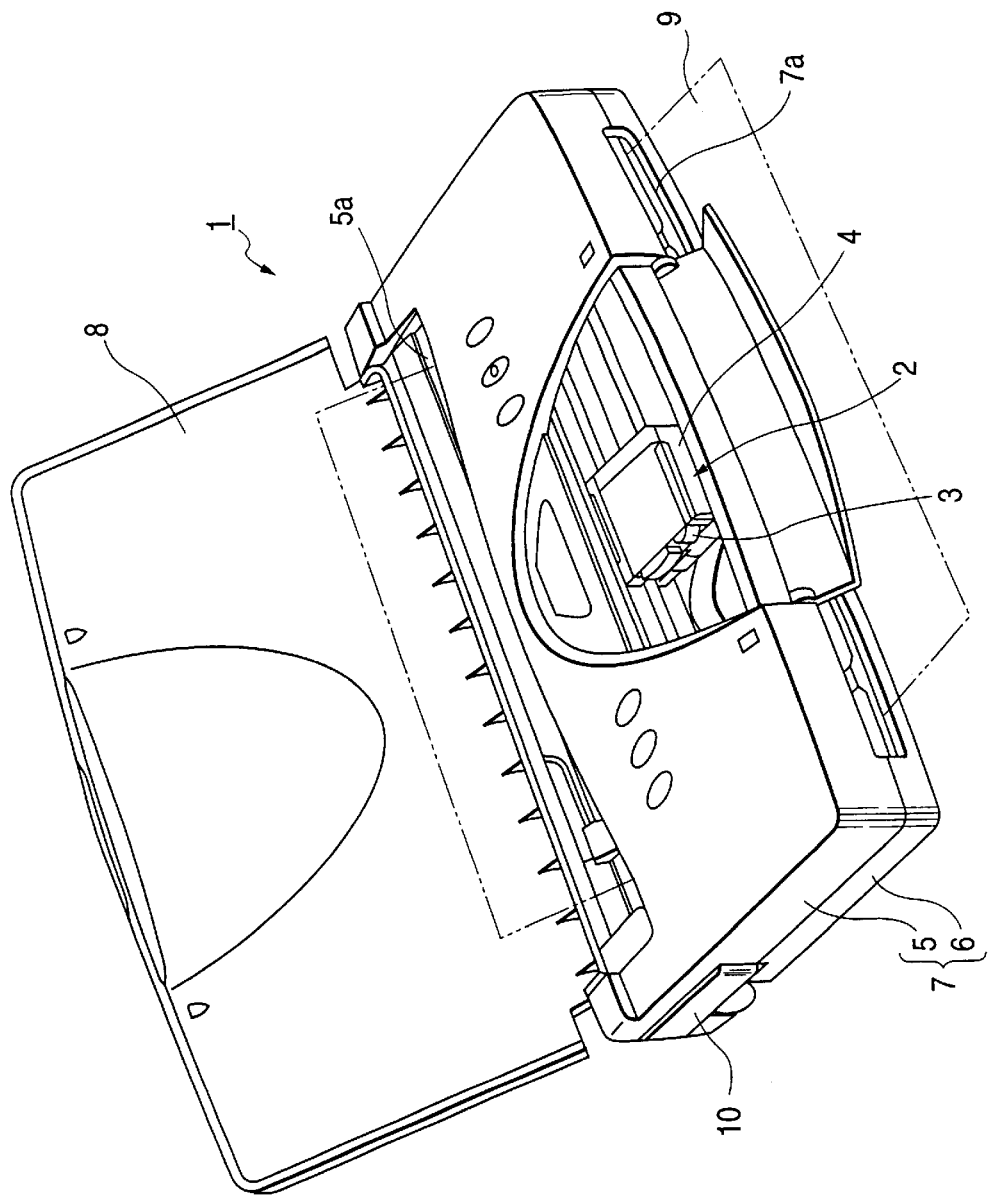
FIG. 1 is a perspective view schematically showing the construction of a printer as an embodiment of the present invention.

FIG. 1 is a perspective view schematically showing the construction of an embodiment of the printer of the present invention (for the details, see Japanese Laid-Open Patent Application No. 8-058107). As shown in FIG. 1, the printer 1 of the present embodiment is comprised of recording means 2 comprising a recording head 3 carried on a carriage 4, the recording means 2 being contained in an outer case 7 comprised of an upper case 5 and a lower case 6.

A top cover 8 covering the upper case 5 is provided on the inner part of the upper case 5 so as to be openable and closable relative to the upper case 5, and further a feeding opening portion 5a for feeding a recording medium 9 into the printer 1 is provided in the upper surface of the inner part of the upper case 5. Thus, by the top cover 8 being opened, the top cover 8 provides a tray for setting the recording medium in the printer 1.

When the recording medium 9 is conveyed downwardly of the carriage 4 from the feeding opening portion 5a by conveying means (not shown) provided in the printer 1, the carriage 4 is scanned in a direction intersecting with the direction of conveyance of the recording medium 9 (e.g. a direction orthogonal to said direction of conveyance) on the basis of a signal from a control circuit (not shown). Ink is then discharged from a plurality of discharge ports (not shown) provided in the recording head held on the carriage 4, for example, an ink jet recording head cartridge 3 comprising an ink jet recording portion and an ink tank portion made integral with each other, to the recording paper 9 which is a recording medium, and image information is recorded on the recording medium 9. A heat generating resistance member as means for generating heat energy for discharging ink from the ink discharge ports is disposed in the aforementioned ink jet recording portion. The recording medium 9 on which the image information has been recorded is further conveyed by the conveying means, and is discharged out of the printer 1 through a discharge opening portion 7a formed in the front face of the outer case 7.

Also, the printer 1 of the present embodiment has an infrared ray communication unit 10 for effecting data communication with a data processing apparatus (not shown) by the use of an infrared ray contained in the right side relative to the direction of conveyance of the recording medium 9. In the state in which the infrared ray communication unit 10 is contained in the printer 1, a portion of the case member of the infrared ray communication unit 10 forms a portion of the surface of the outer case 7 of the printer 1. Also, the infrared ray communication unit 10 is provided on that side of the printer 1 which is along the direction of conveyance of the recording medium 9 and therefore does not hamper a set recording medium 9 or a discharged recording medium 9. The infrared ray communication unit 10 will hereinafter be described.

Figure 2:
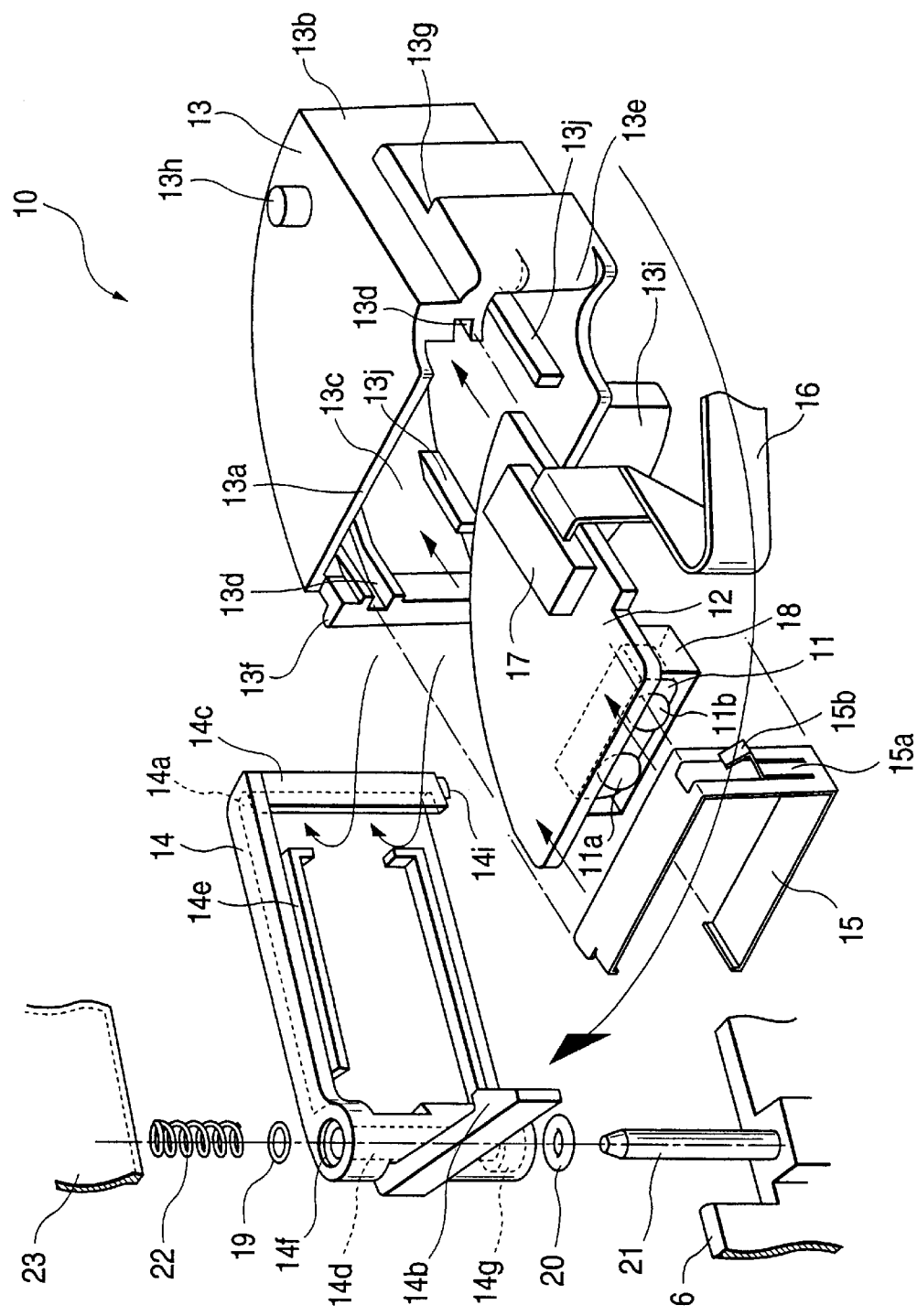
FIG. 2 is an exploded perspective view of the infrared ray communication unit of the printer shown in FIG. 1.

FIG. 2 is an exploded perspective view of the infrared ray communication unit of the printer shown in FIG. 1.

As shown in FIG. 2, the infrared ray communication unit 10 has a printed base plate 12 on which an infrared ray communication element 11 is mounted, a first case member 13 and a second case member 14 constituting a case in which the printed base plate 12 is contained, and a noise shield 15 for preventing the entry of noise into the infrared ray communication unit 10.

The printed base plate 12 will first be described.

The infrared ray communication element 11 is mounted on the printed base plate 12 and in addition, a driving circuit for driving the infrared ray communication element 11, a power source circuit and a protection circuit (all being not shown) are formed on the printed base plate 12. Further, a connector 17 to which a flexible cable 16 is connected is mounted on the printed base plate 12. The infrared ray communication element 11 has an infrared ray emitting portion 11a for transmitting data from the printer 1 to the data processing apparatus, and an infrared ray receiving portion 11b for receiving the data transmitted from the data processing apparatus.

Also, the infrared ray communication element 11 has its side, bottom surface and back (a surface opposite to the surface on which the infrared ray emitting portion 11a, etc. are formed) covered by a shield plate 18 formed by a metallic plate being bent. The shield plate 18 is fixed to the printed base plate 12 while being electrically connected to the ground line of the printed base plate 12. Thereby, any noise generated from the power source line of the printed base plate 12 is intercepted by the shield plate 18 and therefore, malfunctioning of the infrared ray communication element 11 is prevented.

The first case member 13 will now be described.

The first case member 13 is formed into a substantially sectoral shape and has planar side portions 13a, 13b and a curved side portion 13c. However, the planar side portion 13a is formed with an opening portion.

The inner wall of the first case member 13 is formed with a groove portion 13d for guiding the side edge of the printed base plate 12 when the printed base plate 12 is to be contained from the opening portion into the first case member 13 and effecting the positioning of the printed base plate 12. A flexible cable guide 13e having a smooth curved surface is formed on the right edge of the opening portion as viewed in FIG. 2 so that a flexible cable 16 can be drawn out of the case without being bent. Also, a hook portion 13f engaged with the hook groove 14a of the second case member 14, which will be described later, is formed on the left edge of the opening portion as viewed in FIG. 2 and further, a pawl portion engaging portion 13g engaged by the pawl portion 14b of the second case member 14 is formed on the planar side portion 13b. Further, a projection-like stopper 13h is provided on the upper surface portion of the first case member 13, and a first finger engaging portion 13i is provided on the lower surface portion of the first case member 13.

The second case member 14 will now be described.

The second case member 14 is a planar member covering the opening portion of the first case member 13, and as previously described, has the hook groove 14a engaged by the hook portion 13f of the first hook member 13, and the pawl portion 14b engaged by the pawl portion engaging portion 13g of the first case member 13. Further, a second finger engaging portion 14c is formed on the surface of a portion formed with the hook groove 14a. Also, the second case member 14 is provided with a shaft aperture portion 14d supported by a pivot shaft 21 fixed to the lower case 6. The shaft aperture portion 14d is provided so as to be located near the flexible cable guide 13b of the first case member 13 when the first case member 13 and the second case member 14 are united together. Further, the second case member 14 is provided with a rib 14e for holding the noise shield 15. Also, a first click projection 14i is provided on the lower surface of the second finger engaging portion 14c.

The noise shield 15 is formed by a metallic plate being bent. The noise shield 15 is formed with a beam portion 15a by a portion of the side thereof being hollowed out, and a contact 15b provided by being bent into a mountain-shape is provided on the tip end of the beam portion 15a.

The infrared ray communication unit 10 is constructed by combining the first case member 13 and the second case member 14 together in a state in which the printed base plate 12 is fixedly contained in the groove portion 13a of the first case member 13 and the noise shield 15 is sandwiched between the ribs 14e of the second case member 14. By adopting the construction as described above in which the printed base plate 12 is fixedly contained in the groove portion 13a of the first case member 13, a step such as screwing becomes unnecessary and thus, the number of assembling steps is curtailed and space saving can also be achieved.

Figure 3:
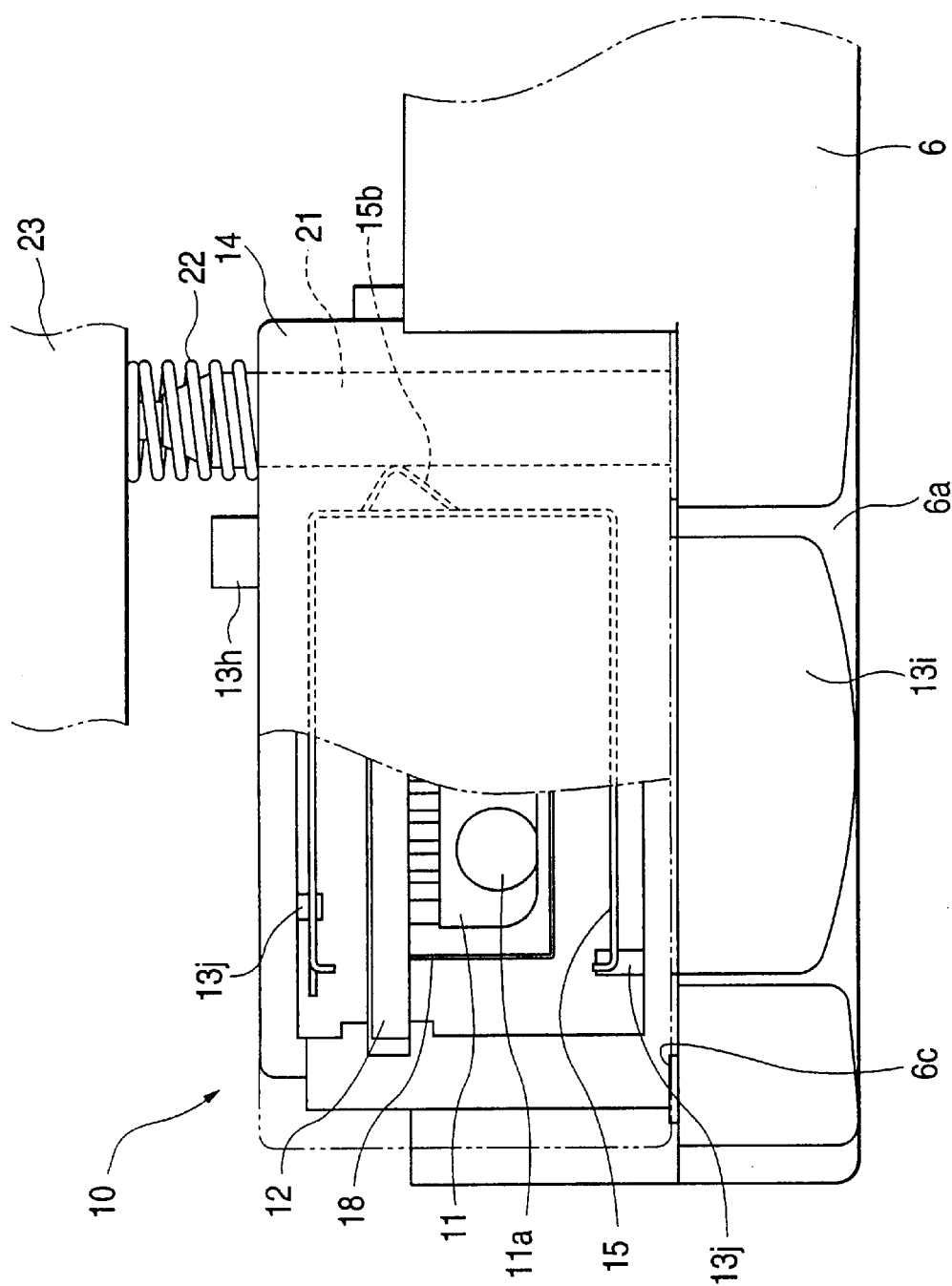
FIG. 3 is a front view showing the infrared ray communication unit shown in FIG. 1 with a second case portion in front thereof.

FIG. 3 is a front view showing the infrared ray communication unit shown in FIG. 1 with the second case member in front thereof. However, a portion of the second case member 14 and the upper case 5 of the printer 1 are omitted in the view.

As shown in FIG. 3, the second case member 14 is disposed in front of the light receiving portion 11a and light emitting portion 11b (see FIG. 2) of the infrared ray communication element 11.

The material of the second case member 14 is a material that can substantially intercept the light of a wavelength in the visible light range and exhibit high transmittance for the light of a wavelength used in infrared ray communication. Specifically, in the present embodiment, use is made of toned polycarbonate resin of which the transmittance for the light in the visible light range (wavelength of about 380 nm-780 nm) is 1% or less and the transmittance for the light in the infrared ray range (wavelength of about 850 nm-900 nm) is 87% or greater.

Thereby, almost all of the visible light is intercepted and therefore, the second case member 14 functions as an infrared ray transmitting window which is an infrared ray filter, and the entry of a noise component included in extraneous light such as a fluorescent lamp that can be a factor causing malfunctioning of the infrared ray communication element 11 into the second case member 14 is prevented. On the other hand, the internal part such as the infrared ray communication element 11 becomes almost invisible from the outside of the infrared ray communication unit 10 and therefore does not diminish the appearance of the printer 1. Further, as described above, the second case member 14 functions as a filter which intercepts any extraneous light noise and therefore, the curtailment of the number of parts and the curtailment of the number of assembling steps can be achieved and moreover, the accuracy and reliability of infrared ray communication can be heightened.

Also, the noise shield 15 is sandwiched between the ribs 14e (see FIG. 2) of the second case member 14 and does not contact with the printed base plate 12, the shield plate 18 and the infrared ray communication element 11. Also, the noise shield 15 bears against a plurality of ribs 13j formed on the inner surface of the first case member 13 and has its movement in the direction of opening (the direction of arrow) of the first case member 13 regulated. Thereby, the noise shield 15 is fixed so that the upper and lower flat portions thereof may be along the joint 10a (see FIG. 4) of the first case member 13 and the second case member 14.

The lower case 6 is provided with a recess 6a for containing therein a first finger engaging portion 13i provided on the first case member 13 of the infrared ray communication unit 10.

Description will now be made of the installation and construction of the infrared ray communication unit 10 relative to the printer 1.

As shown in FIG. 2, the second case member 14 is provided with the aforedescribed shaft aperture portion 14d. A washer receptor 14f in which a washer 19 is installed is formed on the upper portion of the shaft aperture portion 14d, and a rubber ring receptor 14g in which a rubber ring 20 is installed is formed on the lower portion of the shaft aperture portion 14d.

When the rubber ring 20 is mounted in the rubber ring receptor 14g and a metallic rotatable shaft 21 fixed to the lower case is inserted into the shaft aperture portion 14d, the rotatable shaft 21 protrudes from the upper portion of the shaft aperture portion 14d and the infrared ray communication unit 10 is supported for rotation about a pivot shaft 21. At this time, as shown in FIG. 3, the contact 15b of the noise shield 15 installed in the infrared ray communication unit 10 is always brought into contact with the pivot shaft 21 by the resiliency of the beam portion 15a (see FIG. 2). Turning back to FIG. 2, the rubber ring 20 is formed of a rubber material having elasticity and therefore, by being compressed between the rubber ring receptor 14g and the pivot shaft 21, it is given moderate friction when the infrared ray communication unit 10 is rotated. Thus, by adopting a construction in which friction during the rotation of the infrared ray communication unit 10 is obtained by only the rubber ring 20 having elasticity, the construction of the infrared ray communication unit 10 is simplified and therefore the assembling property is improved.

Subsequently, the washer 19 is inserted into the pivot shaft 21 protruding from the upper portion of the shaft aperture portion 14d and the washer 19 is installed in the washer receptor 14f and further, a metallic spring 22 is inserted into the pivot shaft 21 while being forced thereinto, and the lower end portion of the spring 22 is rammed against the washer 19. The washer 19 is formed of a material such as resin of relatively high sliding property. By installing the washer 19, the lower end portion of the spring 22 is prevented from being caught by the bottom of the washer receptor 14f when the infrared ray communication unit 10 is rotated, and the infrared ray communication unit 10 is prevented from being rotated back by the reaction by the torsional flexure of the spring 22.

Further, as shown in FIGS. 2 and 3, the upper end portion of the spring 22 bears against a metallic chassis 23 provided in the printer 1 and grounded. Thereby, the noise shield installed in the infrared ray communication unit 10 is grounded through the pivot shaft 21 and the spring 22.

Also, as shown in FIG. 3, the lower case 6 is provided with a second click projection 6c. When the infrared ray communication unit 10 is contained in the printer 1, the second click projection 6c and the aforementioned first click projection 14i (see FIG. 2) come into engagement with each other, and a moderate click feeling is given to an operator.

Figure 4:
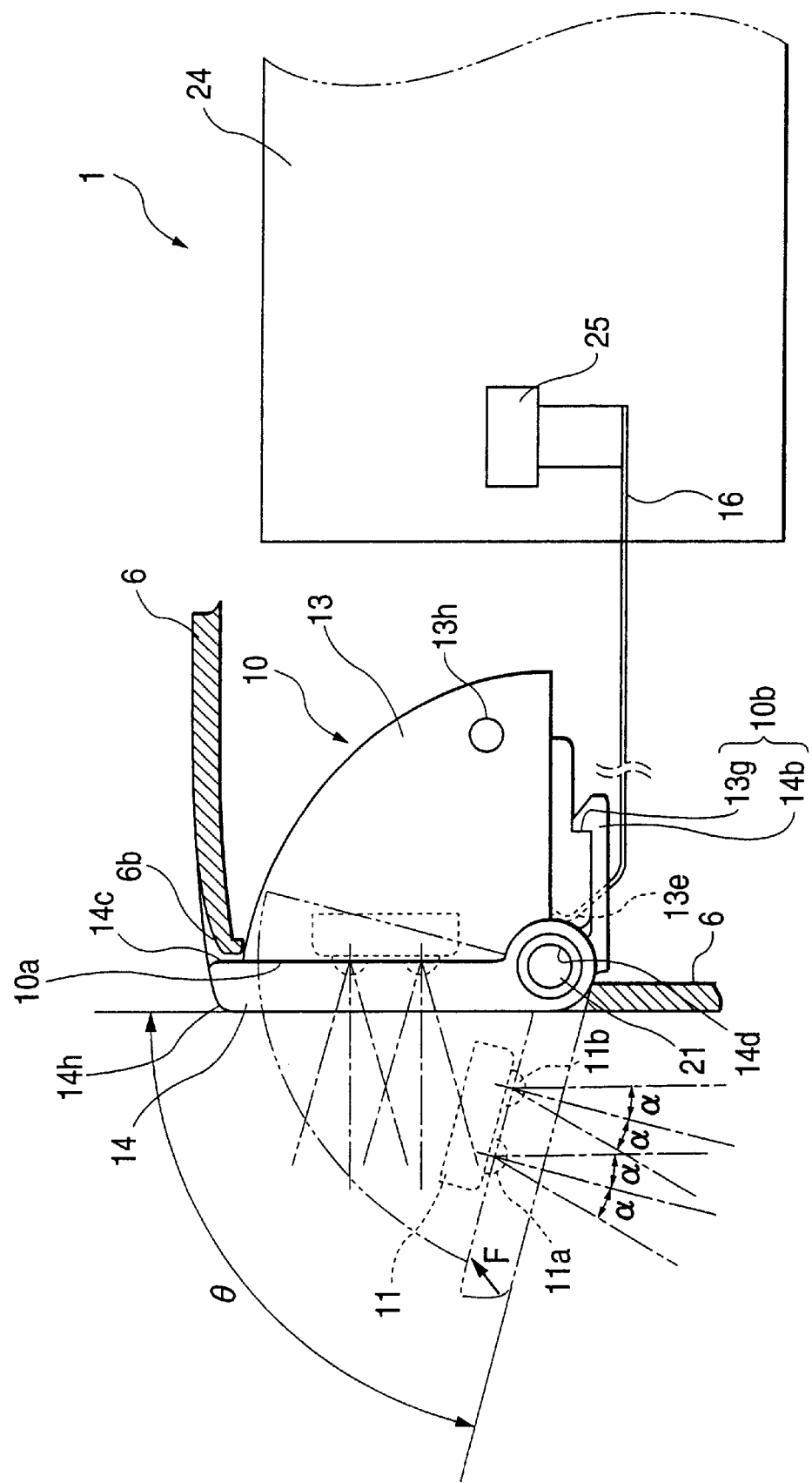
FIG. 4 is a partly broken-away cross-sectional top plan view of the interior of the printer shown in FIG. 1.

FIG. 4 is a partly broken-away cross-sectional top plan view showing the interior of the printer shown in FIG. 1. As shown in FIG. 4, a flexible cable 16 connected to the printed base plate 12 (see FIG. 2) is drawn out of the case along a flexible cable guide 13*b* formed on the first case member 13, and is connected to a connector 25 mounted on a main base plate 24 fixed in the printer 1. That is, the transmission of an electrical signal between the main base plate 24 and the infrared ray communication unit 10 is effected by the flexible cable 16.

Description will now be made of the operation, etc. of the infrared ray communication unit 10 constructed as described above.

As shown in FIG. 2, the infrared ray communication unit 10 is provided with the first finger engaging portion 13*f* formed on the first case member 13, and the second finger engaging portion 14*c* formed on the second case member 14, as previously described.

Therefore, a finger is inserted into a recess 6*a* (see FIG. 3) formed in the lower case 6 of the printer 1 and a finger is engaged with the finger engaging portion 13*f*, and the infrared ray communication unit 10 is drawn out while the engagement between the aforementioned first click projection 14*i* and the second click projection 6*c* (see FIG. 3) is released, whereby the infrared ray communication unit 10 is rotated about the pivot shaft 21. Thereby, the infrared ray communication unit 10 can be easily brought from the state in which it is contained in the printer 1 into a state in which it is protruded outwardly of the printer with a moderate click feeling. That is, the infrared ray communication unit 10 having the infrared ray communication element 11 and the case member 14 as an infrared ray transmitting window and rotatably supported on the printer 1 assumes a state in which the second case member 14 is protruded from the surface of the outer case 7 of the printer 1.

Also, as shown in FIG. 4, a finger can be engaged with the second finger engaging portion 14*c* from a recess 6*b* formed in the back of the lower case 6, whereby as described above, the infrared ray communication unit 10 can be easily brought from the state in which it is contained in the printer 1 into a state in which it is protruded outwardly of the printer 1.

Figure 5:
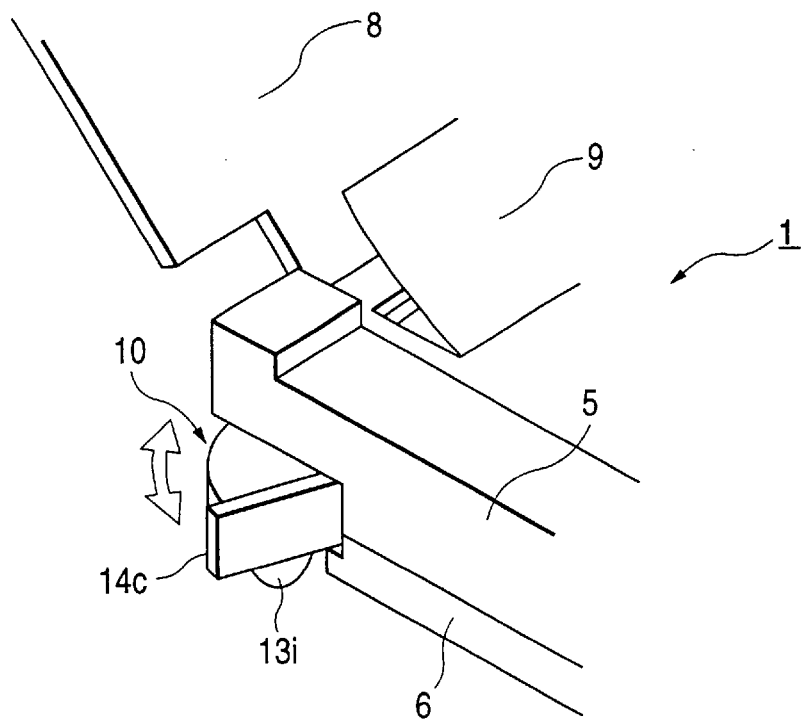
FIG. 5 is a perspective view showing the printer shown in FIG. 1 with the infrared ray communication unit drawn out.
Figure 6:
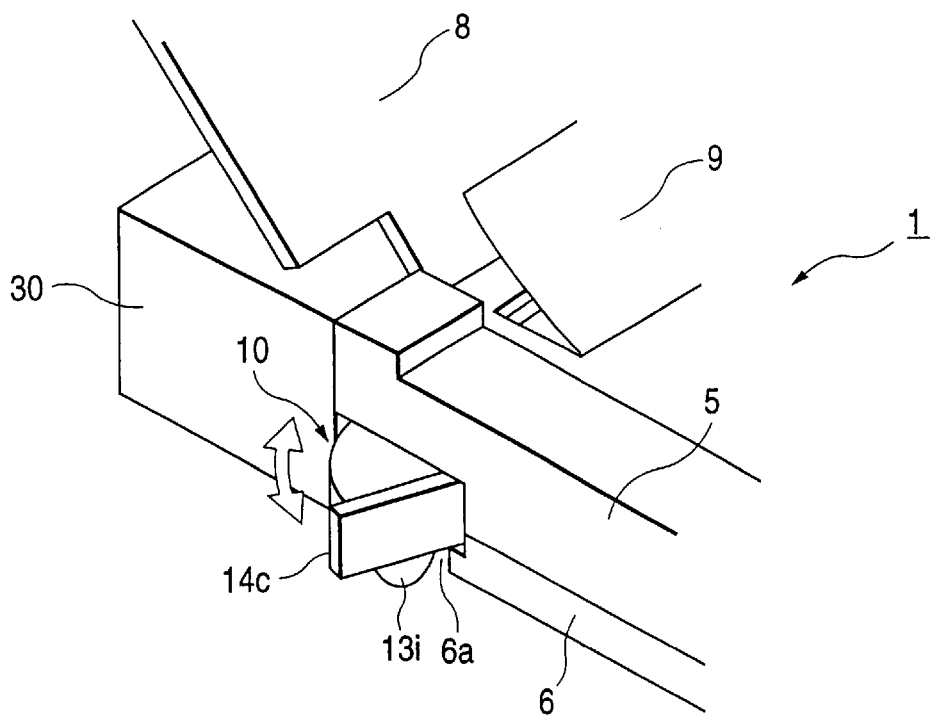
FIG. 6 is a perspective view showing the printer having an exterior battery mounted on the back thereof with the infrared ray communication unit drawn out.

Accordingly, when as shown in FIG. 5, the printer 1 is singly used, a finger can be engaged with the second finger engaging portion 14*c* from the back of the printer 1 to thereby rotate the infrared ray communication unit 10 and draw the infrared ray communication unit 10 out of the printer 1. Also, by a finger being engaged with the first finger engaging portion 13*f* from the recess 6*a* formed in the lower case 6, and rotating the infrared ray communication unit 10, the infrared ray communication unit 10 can be drawn out of the printer 1. On the other hand, when as shown in FIG. 6, an exterior type battery 30 or the like is mounted on the back of the printer 1, whereby a finger becomes unengageable with the second finger engaging portion 14*c*, a finger can be engaged with the first finger engaging portion 13*f* from the recess 6*a* formed in the lower case 6 to thereby rotate the infrared ray communication unit 10 and draw out the infrared ray communication unit 10 from the surface of the outer case 7 of the printer 1.

Also, as shown in FIG. 4, the edge portion 14*h* of the second case member 14 which becomes the remotest end portion from the printer 1 when the infrared ray communication unit 10 is rotated is formed roundly. Further, the maximum angle of rotation θ of the infrared ray communication unit 10 is set to be less than 90°.

Thus, even if some shock or impact should be applied to the infrared ray communication unit 10 from the side thereof with the infrared ray communication unit 10 protruded from the printer 1, it is difficult for the edge portion 14*h* which is rounded to be caught by the surface of the colliding article and further, since the maximum angle of rotation θ of the infrared ray communication unit 10 is set to be less than 90°, a force F applied to the edge portion 14*h* works in a direction to cause the infrared ray communication unit 10 to be contained in the printer 1. Accordingly, the infrared ray communication unit 10 is smoothly contained in the printer 1 and therefore, the possibility of the shaft aperture portion 14*d* inserted in the pivot shaft 21 and a stopper 13*h* being seriously damaged becomes low.

In contrast, if the maximum angle of rotation θ of the infrared ray communication unit 10 is 90° or greater, the force F applied to the edge portion 14*h* when a shock is applied to the infrared ray communication unit 10 from sideways thereof will work in a direction to further open the infrared ray communication unit 10 and may damage the shaft aperture portion 14*d* and the stopper 13*h*. Accordingly, as in the present embodiment, the maximum angle of rotation θ of the infrared ray communication unit 10 is set to be less than 90°, whereby the reliability of the structural strength of the infrared ray communication unit 10 is improved as compared with a case where the infrared ray communication unit 10 opens to 90 ° or greater.

Further, according to the result of the study of the present embodiment, the angle of rotation for which there is obtained the degree of freedom of the disposition relation between the data processing apparatus which is the object of infrared ray communication and the printer is about 30° or greater, and on the other hand, the angle of rotation for which it is difficult for the infrared ray communication unit 10 to be destroyed or otherwise seriously damaged as during the fall of the printer 1 is about 85° or less, and from this fact, it is desirable that the maximum angle of rotation θ of the infrared ray communication unit 10 be 30°≦θ≦85°.

In FIG. 4, the dots-and-dash line indicates the infrared ray communication unit as it has been drawn out of the printer.

The maximum angle of rotation θ of the infrared ray communication unit 10 from the side of the printer 1 which is shown in FIG. 4 is regulated by the stopper 13*h* formed on the upper surface portion of the first case member 13 bearing against the inner wall of the upper case 5 (see FIG. 1) of the printer 1. In the present embodiment, the position of the stopper 13*h* is determined so that θ=75°, and the infrared ray communication unit 10 cannot be opened to an angle greater than 75°.

As shown in FIG. 4, the infrared ray communication element 11 has the specification of achieving desired light receiving performance or light emitting performance within the angle range of ±α from the front direction of the light receiving portion 11*a* and the light emitting portion 11*b*. In the infrared ray communication element 11 used in the present embodiment, α=15° and therefore, the front direction of the printer 1 is also included in the infrared ray communication possible range at the position whereat the infrared ray communication unit 10 has been most drawn out (θ=75°).

Also, as can be seen from FIG. 4, when the infrared ray communication unit 10 is rotated, the flexible cable guide 13*e* which is the draw-out port of the flexible cable 16 is also rotated therewith. In the present embodiment, as previously described, the flexible cable guide 13*e* is formed at the right edge of the opening portion of the first case member 13 near the pivot shaft 21. Therefore, the amount of displacement of the flexible cable 16 resulting from the rotation is smaller than when the flexible cable guide is provided at another position. Accordingly, the movement of the flexible cable 16 resulting from the rotation of the infrared ray communication unit 10 is minimized and therefore, it is difficult for the bending, tension, etc. of the cable to occur, and the occurrence of an accident such as the breakage of the signal line of the cable or the contact thereof with another part can be prevented.

Further, a case member restraining structure comprised of the pawl portion 14b of the second case member 14 and the pawl portion engaging portion 13g of the first case member 13 is not exposed outside the printer 1 even when the infrared ray communication unit 10 is maximally rotated. Therefore, there is not the possibility that the second case member 14 suddenly touches a case member restraining portion 10b and thereby comes off the first case member 13, and the infrared ray communication element 11 contained in the infrared ray communication unit 10 can be protected more reliably.

In addition, the second finger engaging portion 14c is provided on the surface of a portion formed with a hook groove 14a (see FIG. 2) engaged by the hook portion 13f of the first case member 13, whereby when a finger is engaged with the second finger engaging portion 14c to thereby rotate the infrared ray communication unit 10, it never happens that the second case member 14 comes off the first case member 13.

When the operator rotates the infrared ray communication unit 10, the discharge of static electricity may happen, for example, from a finger tip or the like, depending on the environment or the like. The infrared ray communication element 11 is relatively susceptible to electrical shock by static electricity and therefore, static electricity must be made to escape quickly to the chassis portion or the like of the printer 1 which is sufficiently grounded.

In the present embodiment, the case parts constituting the infrared ray communication unit 10 number only two parts, i.e., the first and second case members 13 and 14, and therefore, the gap in the case which provides the entry path of static electricity into the infrared ray communication unit 10 is limited to the joint portion 10a between these two parts. Further, of this joint portion 10a, a joint portion 10a comprising the hook portion 13f of the first case member 13 and the hook groove 14a of the second case member 14 shown in FIG. 2 are of turned-back structure and therefore, it is difficult for static electricity to enter this joint portion. Also, static electricity enters through joint portions 10a formed on the upper surface portion and lower surface portion of the infrared ray communication unit 10, but the static electricity which has entered flows from the noise shield 15 fixed near those joint portions 10a to a metallic chassis 23 through the pivot shaft 21 and the spring 22 and therefore, the static electricity does not contact the printed base plate 12 including the infrared ray communication element 11, and the malfunctioning and destruction of the printer 1 can be prevented. That is, static electricity eliminating means for eliminating the static electricity entering the interior of the infrared ray communication unit 10 through the joint portion 10a which is the gap between the first case member 13 and the second case member 14 to the outside of the infrared ray communication unit 10 is constituted by the noise shield 15, the pivot shaft 21 and the spring 22.

Reference is now had to FIGS. 7 to 11 to describe an example of the arrangement of the printer 1 provided with the infrared ray communication unit 10 and the data processing apparatus such as a computer.

Figure 7:
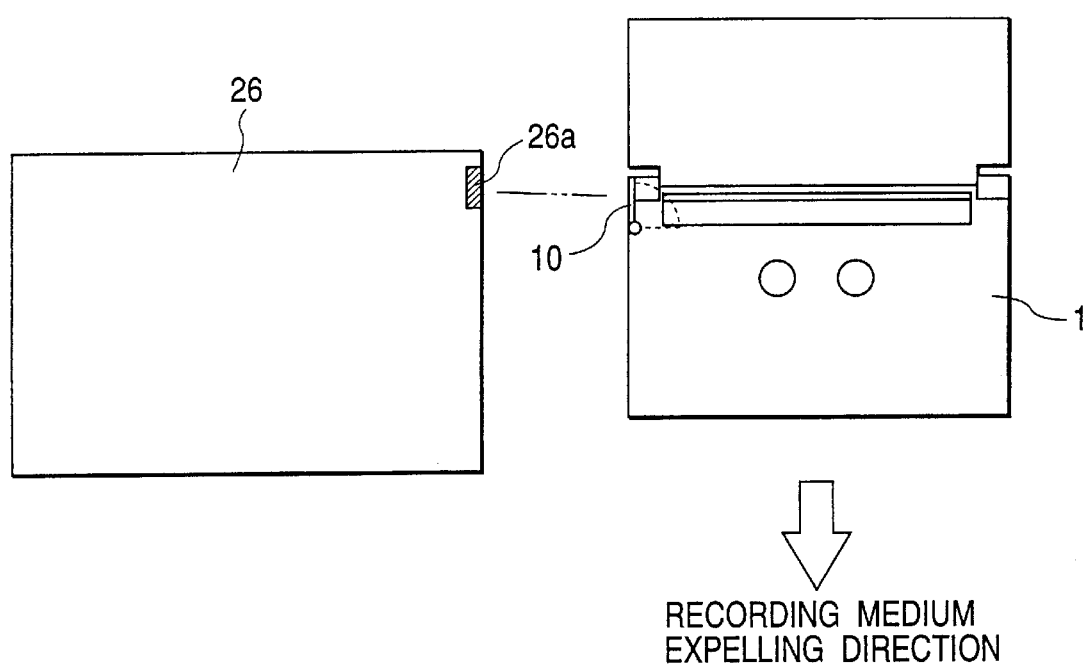
FIG. 7 is a top plan view showing the disposition relation between a data processing apparatus having an infrared ray communication portion fixed to the right side thereof and the printer.

FIG. 7 is a top plan view showing the disposition relation between a data processing apparatus having an infrared ray communication portion fixed to the right side thereof and the printer.

As shown in FIG. 7, with the infrared ray communication unit 10 provided on the left side of the printer 1 remaining contained in the printer 1, the printer 1 is disposed on the right side of the data processing apparatus 26, whereby the infrared ray communication portion 26a of the data processing apparatus 26 and the infrared ray communication unit 10 of the printer 1 are opposed to each other and infrared ray communication between the two is effected well. Further, near the front face of the printer 1, there is no apparatus or the like which is an obstacle and therefore, there is no hindrance to the operability of the data processing apparatus 26 and the discharging operation for the recording medium 9 (see FIG. 1) after the recording of image information.

Figure 8:
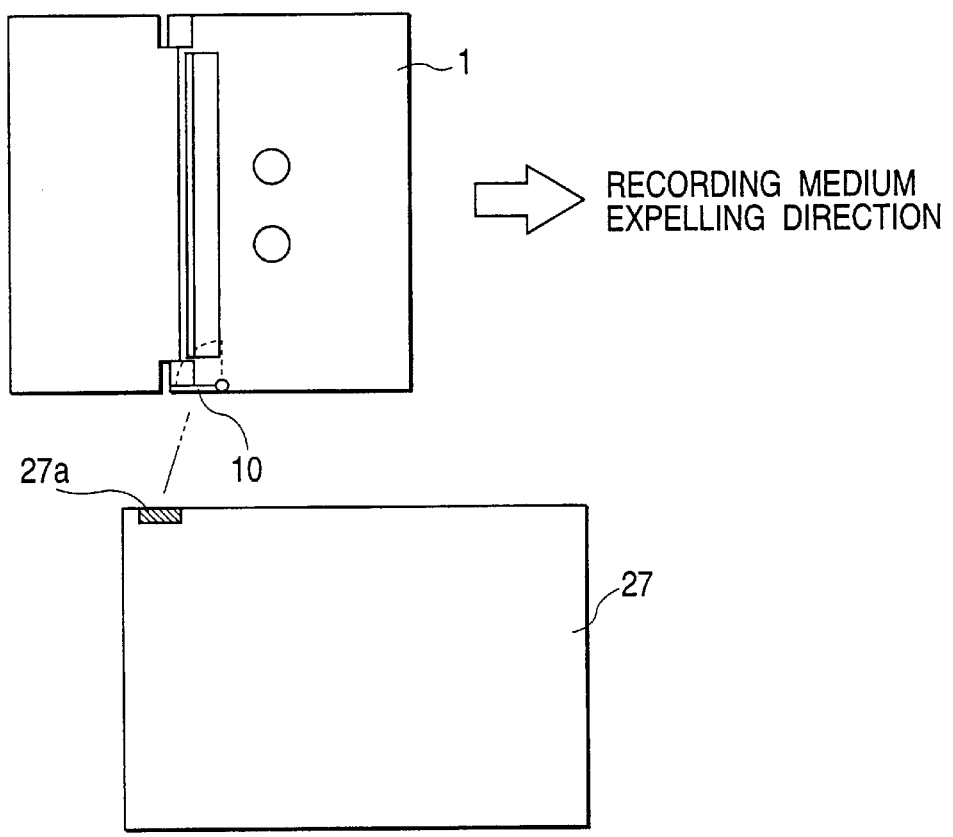
FIG. 8 is a top plan view showing the disposition relation between a data processing apparatus having the infrared ray communication portion fixed to the back thereof and the printer.

FIG. 8 is a top plan view showing the disposition relation between a data processing apparatus having the infrared ray communication portion fixed to the back thereof and the printer.

As shown in FIG. 8, with the infrared ray communication unit 10 provided on the left side of the printer 1 remaining contained in the printer, the printer 1 is disposed on the back of the data processing apparatus 27, whereby the infrared ray communication portion 27a of the data processing apparatus 27 and the infrared ray communication unit 10 of the printer 1 are opposed to each other. Thereby, as described above, infrared ray communication between the two is effected well and there is no hindrance to the operability of the data processing apparatus 27 and the discharging operation for the recording medium 9 (see FIG. 1).

Figure 9:
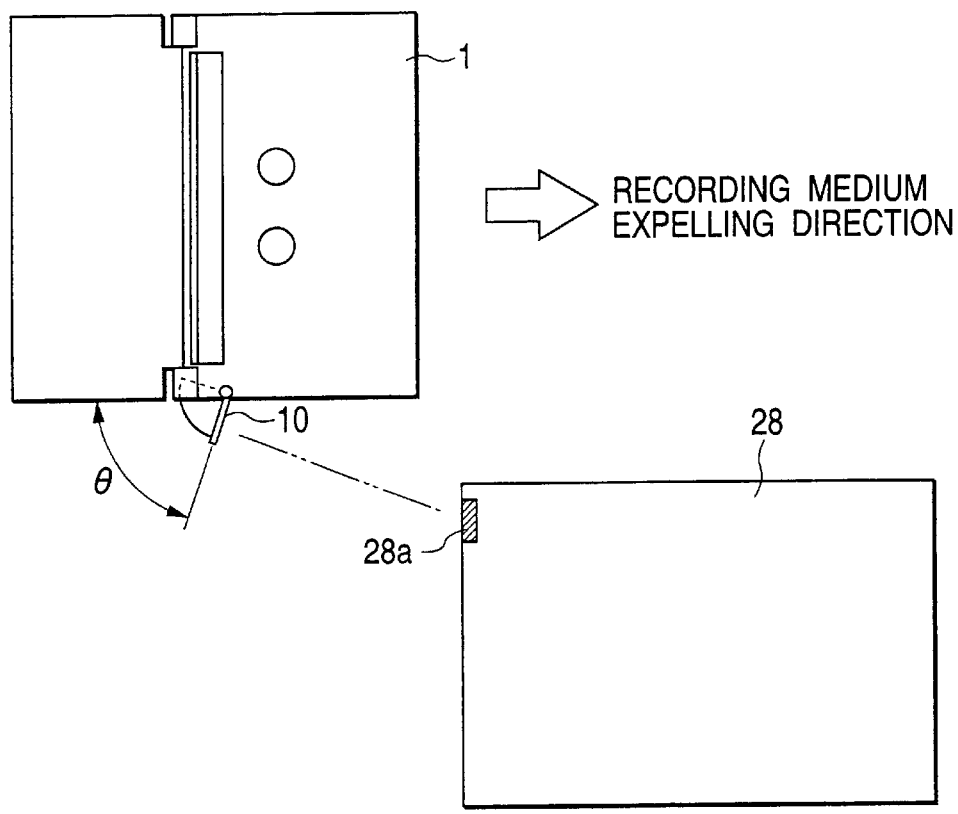
FIG. 9 is a top plan view showing the disposition relation between a data processing apparatus having the infrared ray communication portion fixed to the left side thereof and the printer.

FIG. 9 is a top plan view showing the disposition relation between a data processing apparatus having an infrared ray communication portion fixed to the left side thereof and the printer.

As shown in FIG. 9, with the infrared ray communication unit 10 drawn out of the printer 1 by an angle θ, the printer 1 with its left side turned to the front is disposed leftwardly rearwardly of the data processing apparatus 28, whereby the infrared ray communication portion 28a of the data processing apparatus 28 and the infrared ray communication unit 10 of the printer 1 are opposed to each other at an angle whereat desired communication performance is displayed. Thereby, as described above, infrared ray communication between the two is effected well and there is no hindrance to the operability of the data processing apparatus 28 and the discharging operation for the recording medium 9 (see FIG. 1).

Figure 10:
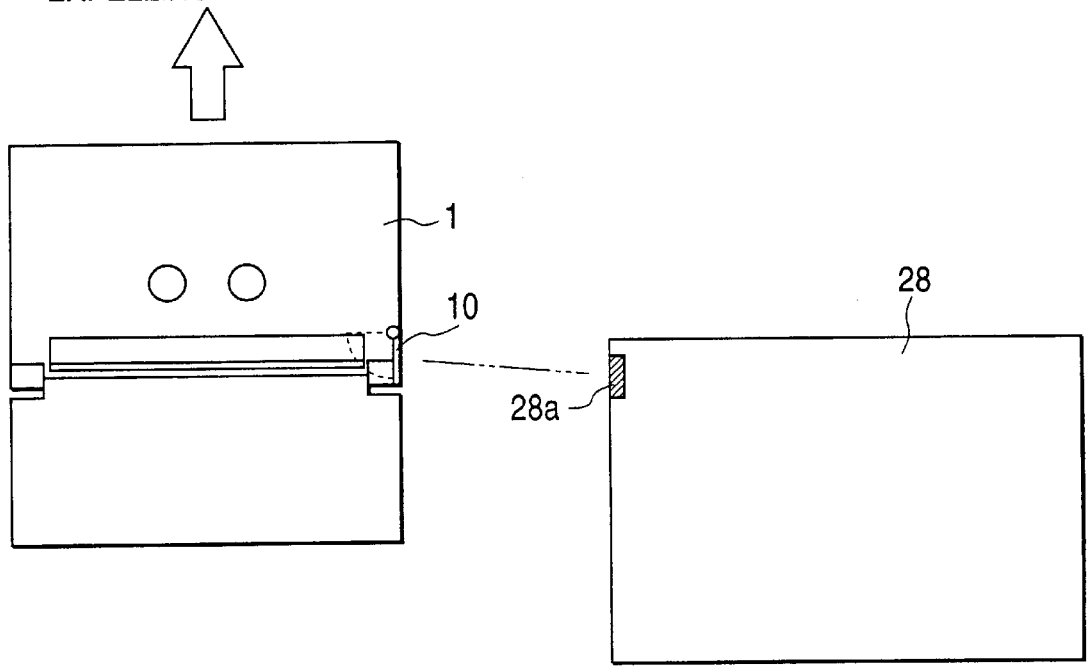
FIG. 10 is a top plan view showing the disposition relation between the data processing apparatus having the infrared ray communication portion fixed to the left side thereof and the printer.

As shown in FIG. 10, with the infrared ray communication unit 10 provided on the left side of the printer 1 remaining contained in the printer 1, the infrared ray communication unit 10 and the infrared ray communication portion 28a are opposed to each other and the printer 1 is disposed on the right side of the data processing apparatus 28, whereby also the infrared ray communication between the two is effected well. However, when the space for the recording medium 9 discharged from the printer 1 is taken into consideration, a wider space becomes necessary in the direction of depth of an installation bed on which the printer 1, etc. are installed and therefore, it is evident that the disposition shown in FIG. 9 is superior.

Figure 11:
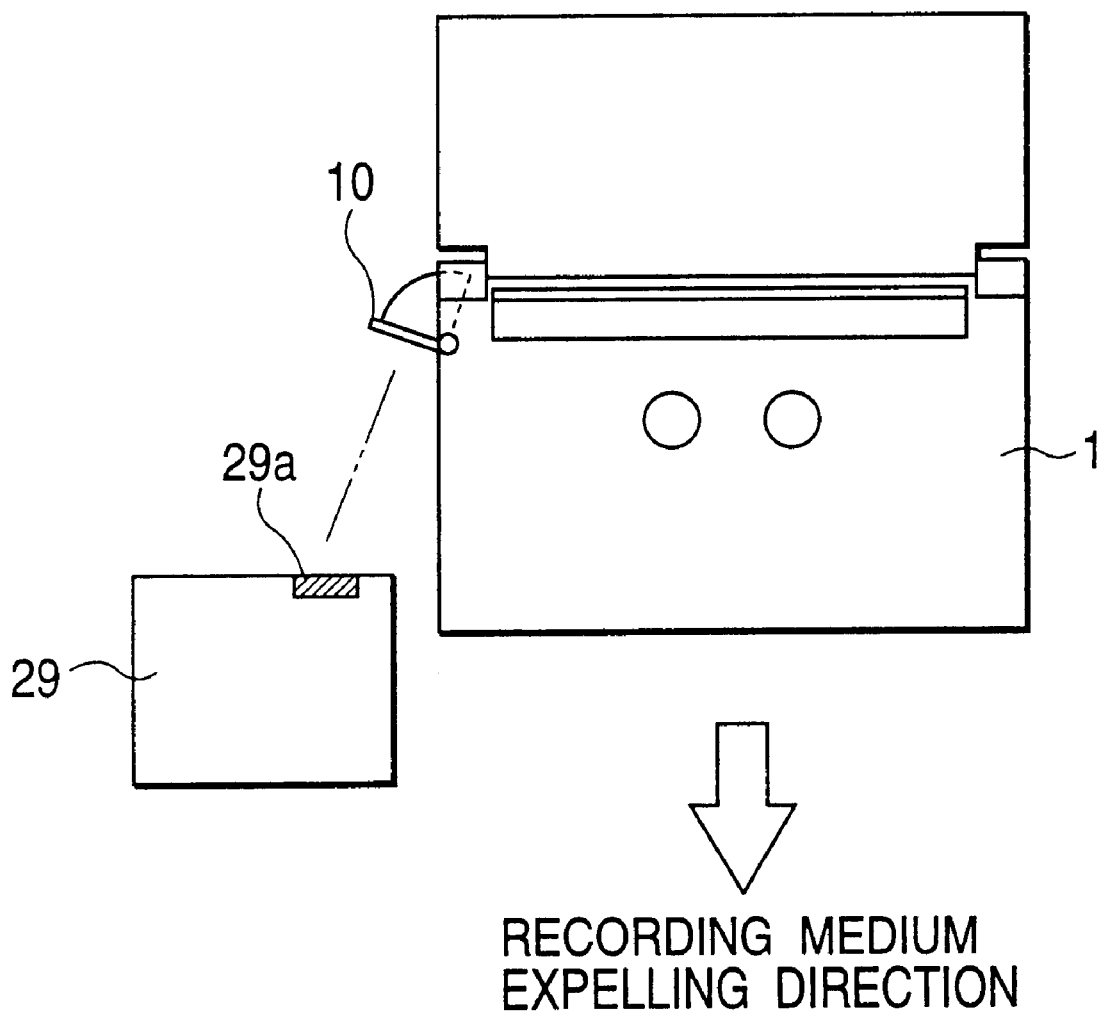
FIG. 11 is a top plan view showing the disposition relation between the data processing apparatus having the infrared ray communication portion fixed to the left side thereof and the printer.

FIG. 11 is a top plan view showing the disposition relation between a data processing apparatus having an infrared ray communication portion fixed to the left side thereof and the printer.

The data processing apparatus shown in FIG. 11 is a small portable information terminal or the like, and has an infrared ray communication portion 29a provided on the back thereof. In this case, the data processing apparatus 29 is portable and therefore, infrared ray communication with the printer 1 can be effected from various directions. However, the infrared ray communication unit 10 of the printer 1 is drawn out in conformity with the direction of communication, whereby infrared ray communication is effected well and therefore, the printer 1 can be operated without the disposed state of the printer 1 being a concern.

As described above, the infrared ray communication unit 10 can be arbitrarily changed over between the state in which it is contained in the printer 1 and the state in which it has been drawn out of the printer 1 and therefore, the area in which infrared ray communication is possible is widened, and the degree of freedom of the disposition with respect to the data processing apparatus can be improved.

The printer as described above is a printer provided with an infrared ray communication unit portion, and the infrared ray communication unit portion is rotatably supported on the printer so as to be capable of being protruded from the outer case of the printer and therefore, the area of the printer which is capable of effecting infrared ray communication is widely secured and thus, the degree of freedom of the disposition relation between the printer and the data processing apparatus can be improved.

Also, the infrared ray communication unit portion is provided on that side of the printer which is along the direction of conveyance of the recording medium, whereby the infrared ray communication unit portion can be prevented from hindering a set recording medium or a discharged recording medium.

Further, the maximum angle of rotation of the infrared ray communication unit from the outer case of the printer is selected between 30° and 85°, whereby the degree of freedom of the disposition relation between the data processing apparatus and the printer can be obtained and it can be made difficult for the infrared ray communication unit portion to receive serious damage such as destruction as during a fall of the printer.

In addition, the edge portion of the infrared ray communication unit which becomes the remotest end portion relative to the outer case of the printer when the infrared ray communication unit is protruded from the outer case of the printer is formed roundly whereby as during the fall of the printer, it becomes difficult for the edge portion of the infrared ray communication unit portion which becomes the remotest end portion from the printer to be caught by the surface of an object, and the infrared ray communication unit portion can be contained more smoothly in the printer.

Also, by adopting a construction in which the flexible cable connected to the printed base plate on which the infrared ray communication element is mounted and which is contained in the infrared ray communication unit portion is drawn out of the infrared ray communication unit portion from the vicinity of the supported portion of the infrared ray communication unit portion, it becomes difficult for the bending, tension, etc. of the cable to occur and the occurrence of accidents such as the breakage of the signal line of the cable and the contact thereof with other parts can be prevented.

Further, a finger engaging portion for drawing the infrared ray communication unit portion out of the printer is provided on the infrared ray communication unit portion, whereby the infrared ray communication unit portion can be easily protruded out of the printer.

Also, the case member of the infrared ray communication unit portion is comprised of a first case member formed with an opening portion and containing the infrared ray communication element therein, and a second case member formed of a material intercepting the light of a wavelength in the visible light range and transmitting therethrough the light of a wavelength used in infrared ray communication, and covering the opening portion of the first case member, whereby the second case member functions as an infrared ray filter and can prevent the entry of an external light noise component which makes the factor of the malfunctioning of the infrared ray communication element.

Further, the restraining portions of the first case member and the second case member are provided so as not to be exposed to the outside of the printer even if the infrared ray communication unit portion is rotated up to a maximum angle of rotation relative to the surface of the outer case, whereby there is not the possibility of the second case member suddenly coming off the first case member, and the infrared ray communication element in the infrared ray communication unit portion can be protected more reliably.

Also, provision is made of static electricity eliminating means for eliminating static electricity entering the interior of the case member to the outside of the case member, whereby static electricity is prevented from falling onto the infrared ray communication element, etc. and therefore, the malfunctioning and destruction of the printer can be prevented.

What is claimed is:

1. A printer for recording on a recording medium by recording means, said printer comprising:
    an infrared light communication unit having an infrared light communication element for performing data communication with an external data processing device with infrared light as a communication medium;
    a printer housing for containing said infrared light communication unit;
    supporting means for rotatably supporting said infrared light communication unit between a first position where said infrared light communication unit is contained in said printer housing and a second position where said infrared light communication unit projects from a surface of said printer housing;
    a case member for said infrared light communication unit containing said infrared light communication element, said case member having a first case member formed with an opening portion at one end surface thereof and containing said infrared light communication element therein, and a second case member formed of a material intercepting light of a wavelength in a visible light range and transmitting therethrough light of a wavelength used in infrared light communication and covering the opening portion of said first case member, and said infrared light communication element faces said second case member and is contained in said first case member; and
    static electricity eliminating means for conducting static electricity, entering from a gap between said first case member and said second case member into the interior of said case member, to the outside of said case member.

2. A printer according to claim 1, wherein said infrared ray communication unit is supported to project from a side of a surface of said printer housing which is along a direction of conveyance of the recording medium.

3. A printer according to claim 1, wherein the maximum angle of rotation of said supporting means for said infrared light communication unit relative to a surface of said printer housing is less than 90°.

4. A printer according to claim 1, wherein the maximum angle of rotation of said supporting means for said infrared light communication unit relative to a surface of said printer housing is within a range of 30° to 85°.

5. A printer according to claim 1, wherein an edge portion of said infrared light communication unit which becomes the remotest end portion relative to a surface of said printer housing when said infrared light communication unit is projected from said printer housing is formed roundly.

6. A printer according to claim 1, wherein said infrared light communication element is mounted on a printed base plate and is contained in said case member with said printed base plate, a flexible cable for effecting data communication with a main base plate provided in said printer is connected to said printed base plate, and said flexible cable is drawn out of said infrared light communication unit through the vicinity of the center of rotation of said infrared light communication unit.

7. A printer according to claim 1, wherein said infrared light communication unit comprises a finger engaging portion.

8. A printer according to claim 1, wherein said first case member and said second case member are restrained into a unit, and a restrained structural portion of said first case member and said second case member is provided so as not to be exposed to the outside of said printer even if said infrared light communication unit is rotated to the maximum angle of rotation relative to a surface of said printer housing.

9. A printer according to claim 1, wherein said first case member and said second case member are restrained so that said second case member may not disengage from said first case member when said infrared light communication unit is rotated by the use of a finger engaging portion.

10. A printer according to claim 1, wherein a supported portion of said infrared light communication unit relative to said printer is provided on said second case member.

11. A printer according to claim 1, wherein said static electricity eliminating means comprises a noise shield portion fixed in the vicinity of the gap, and a pivot shaft portion supporting said infrared light communication unit on said printer and electrically connected to a grounded metallic chassis portion of said printer and said noise shield portion.

12. A printer according to claim 1, wherein a portion of said case member forms a portion of the surface of said printer housing when in the first position.

13. A printer according to any one of claims 1 to 7, 8 to 10, 11 and 12, wherein said recording means comprises an ink jet recording head.

14. A printer according to claim 13, wherein said ink jet recording head comprises a heat generating resistance member for generating heat energy for discharging ink.

* * * * *

UNITED STATES PATENT AND TRADEMARK OFFICE
CERTIFICATE OF CORRECTION

PATENT NO. : 6,507,408 B2  
APPLICATION NO. : 09/119731  
DATED : January 14, 2003  
INVENTOR(S) : Iwasaki et al.

Page 1 of 1

It is certified that error appears in the above-identified patent and that said Letters Patent is hereby corrected as shown below:

<u>COLUMN 14</u>:

Line 21, "claims 1 to 7, 8 to" should read --claims 1 to 12,--.
Line 22, "10, 11 and 12," should be deleted.

Signed and Sealed this

Fifteenth Day of January, 2008

JON W. DUDAS
*Director of the United States Patent and Trademark Office*